(12) United States Patent
Cho et al.

(10) Patent No.: US 11,541,544 B2
(45) Date of Patent: Jan. 3, 2023

(54) INTELLIGENT VEHICLE TRANSFER ROBOT FOR EXECUTING PARKING AND UNPARKING BY LOADING VEHICLE

(71) Applicant: Min Seo Cho, Seoul (KR)

(72) Inventors: Min Seo Cho, Seoul (KR); Hyeon Hui Kim, Seoul (KR)

(73) Assignee: Min Seo Cho, Seoul (KR)

( * ) Notice: Subject to any disclaimer, the term of this patent is extended or adjusted under 35 U.S.C. 154(b) by 106 days.

(21) Appl. No.: 17/252,279

(22) PCT Filed: Jun. 25, 2019

(86) PCT No.: PCT/KR2019/007620
§ 371 (c)(1),
(2) Date: Dec. 15, 2020

(87) PCT Pub. No.: WO2020/004887
PCT Pub. Date: Jan. 2, 2020

(65) Prior Publication Data
US 2021/0260765 A1 Aug. 26, 2021

(30) Foreign Application Priority Data
Jun. 27, 2018 (KR) .................. 10-2018-0074146

(51) Int. Cl.
*B25J 9/00* (2006.01)
*B25J 9/12* (2006.01)
(Continued)

(52) U.S. Cl.
CPC ............. *B25J 9/1679* (2013.01); *B25J 5/007* (2013.01); *B25J 9/0009* (2013.01); *B25J 9/126* (2013.01); *B25J 13/086* (2013.01); *E04H 6/30* (2013.01)

(58) Field of Classification Search
CPC ............. E04H 6/305; E04H 6/36; B60P 3/073
See application file for complete search history.

(56) References Cited

U.S. PATENT DOCUMENTS 3,235,106 A * 2/1966 Diehl ...................... E04H 6/305
414/459
11,149,460 B2 * 10/2021 Lee ........................... B66F 7/02
(Continued)

FOREIGN PATENT DOCUMENTS

JP 2005-329935 A 12/2005
KR 10-2003-0039852 A 5/2003
(Continued)

OTHER PUBLICATIONS

International Search Report for PCT/KR2019/007620 dated Oct. 8, 2019 from Korean Intellectual Property Office.
(Continued)

*Primary Examiner* — Kaitlin S Joerger
(74) *Attorney, Agent, or Firm* — Revolution IP, PLLC (57) ABSTRACT

A vehicle transfer robot (10) of the present invention, disposed vertically on the ground, is formed to have four vertical frames (110) disposed at a predetermined distance apart from each other and formed to have a quadrangular frame, and a quadrangle by connecting the upper end parts of the four vertical frames (110), respectively, wherein the vehicle transfer robot (10) includes: a frame part (100) including an upper frame (120); a driving part (200) installed at each of the lower end parts of the vertical frames (110) for moving the frame part (100); and a carriage (300) installed in the frame part (100) for loading a vehicle.

8 Claims, 9 Drawing Sheets

(51) Int. Cl.
*E04H 6/30* (2006.01)
*B25J 9/16* (2006.01)
*B25J 5/00* (2006.01)
*B25J 13/08* (2006.01)

(56) References Cited

U.S. PATENT DOCUMENTS 11,214,976 B2 * 1/2022 Cho ..................... E04H 6/305
2017/0226764 A1 * 8/2017 Nussbaum ............... E04H 6/24

FOREIGN PATENT DOCUMENTS

| KR | 20-0316188 Y1 | 6/2003 |
| KR | 10-0457859 B1 | 11/2004 |
| KR | 10-0615920 B1 | 8/2006 |
| KR | 10-2007-0024793 A | 3/2007 |
| KR | 10-1608075 B1 | 4/2016 |
| KR | 10-1740877 B1 | 5/2017 |
| WO | 2019/083166 A1 | 5/2019 |

OTHER PUBLICATIONS

European Search Report of European U.S. Appl. No. 19/826,103 dated Aug. 4, 2021.
Office Action of Japanese Patent Application No. 2020-571744 dated Feb. 15, 2022.

\* cited by examiner

INTELLIGENT VEHICLE TRANSFER ROBOT FOR EXECUTING PARKING AND UNPARKING BY LOADING VEHICLE

TECHNICAL FIELD

The present invention relates to a vehicle transfer robot prepared in a flat parking lot, and more particularly, to an intelligent vehicle transfer robot for executing parking and unparking by loading a vehicle, which moves in all directions along parking lines of a flat parking lot, moves after lifting up a vehicle, and transfers the vehicle into a space above a parked vehicle so as to execute parking and unparking of the vehicle.

BACKGROUND ART

A conventional flat parking lot has parking lines formed by dividing an area on a flat floor through paint so as to form a parking unit.

Moreover, a plurality of the parking units are connected with one another adjoining one another to form parking modules, and a vehicle movement passage is formed between front surface parts of the parking modules.

That is, the conventional flat parking lot has a plurality of the parking units which are areas divided to park vehicles one by one, each of the parking modules has a plurality of the parking units adjoining one another, and the vehicle movement passage is formed between the parking modules.

In this instance, the vehicle movement passage deteriorates parking efficiency for the same area since occupying lots of valuable land resources.

Furthermore, in general, a mechanical parking lot has parking means that a vehicle is put on a parking palette, is lifted by a parking stand, and is put on a parking space together with the palette. Therefore, the conventional parking lot has several disadvantages in that it requires a lot of installation expenses of the parking palettes and in that it is difficult to utilize the rooftop of a building as a parking space since requiring parking palettes as many as the parking spaces.

Additionally, the conventional parking lot has fixed rails put in the parking space and the parking stand mounted on a horizontal transfer stand which is transferred in one direction along the fixed rails in order to execute parking and unparking of a vehicle in the parking space like the rooftop using the parking stand having the vehicle loading stand. Therefore, the conventional parking lot has another disadvantage in that it requires lots of changes in structure in order to install such a structure and in that it cannot actively park vehicles according to the form of the parking space.

DISCLOSURE

Technical Problem

Accordingly, the present invention has been made in an effort to solve the above-mentioned problems occurring in the prior arts, and it is an object of the present invention to provide an intelligent vehicle transfer robot, which is prepared in a flat parking lot in order to increase parking efficiency by increasing the number of vehicles parked for the same area without any vehicle movement passage.

It is another object of the present invention is to provide an intelligent vehicle transfer robot for automatically executing parking and unparking by loading a vehicle in a parking space without a change in structure of a parking lot and without installing various structures of parking facilities.

However, objects of the present invention are not limited to the objects described above, and other objects that are not described will be clearly understood by a person skilled in the art from the description below.

Technical Solution

To achieve the above objects, the present invention provides an intelligent vehicle transfer robot comprising: a frame part, which has four vertical frames arranged on the ground vertically and spaced apart from each other at predetermined intervals to form a quadrangular frame and an upper end frame connecting upper end parts of the four vertical frames to form a quadrangle; operation parts respectively mounted at lower end parts of the vertical frames to move the frame part; and carriages mounted on the frame part to load a vehicle.

Moreover, the frame part has four sides, namely, the left side, the right side, the front side and the rear side, by spaces among the four vertical frames, the ground surface and the upper end frame, and the upper end frame is divided into two long side upper end frames having the left side and the right side and two short side upper end frames having the front side and the rear side.

Furthermore, the carriages are respectively arranged on the front side and the rear side of the frame part corresponding to the front and the rear of the vehicle, and includes: a loading part which is transferred toward the front and the rear of the vehicle and on which the vehicle is loaded; and a lifting part combined with the frame part to lift up the loading part.

Additionally, the lifting part includes: guide supports arranged at lower parts of the two short side upper end frames in parallel with each other; transport stands combined with both ends of the guide supports; vertical guide bars respectively mounted in the vertical frames and combined with the transport stands; and ascending and descending driving parts for ascending and descending the transport stands along the vertical guide bars.

In addition, the loading part includes: wheel holder parts on which front wheels and rear wheels of the vehicle are held; and a wheel holder part operating unit connect between the lifting part and the wheel holder part with each other to transfer the wheel holder parts.

Moreover, the wheel holder part operating unit includes: a wheel holder part forward and backward operating part combined with the guide supports to transfer the wheel holder part below the vehicle through a gap between front and rear bumpers of the vehicle and the ground surface.

Furthermore, the wheel holder part operating unit includes: a wheel holder part vertically rotating part for rotating the wheel holder part in a vertical direction which is perpendicular to the ground surface; a first connection part connected between the wheel holder part forward and backward operating part and the wheel holder part vertically rotating part; and a second connection part connected between the wheel holder part vertically rotating part and the wheel holder part.

Additionally, the wheel holder part includes: a mounting plate rotatably combined with the second connection part; and first and second loading stands combined with the upper part of the mounting plate to be bilaterally symmetrical so that wheels of the vehicle are put on the first and second loading stands.

Moreover, the wheel holder part forward and backward operating part includes: first and second horizontal transfer shafts vertically arranged on the guide supports and protruding downwards; first and second transfer support plates with which upper parts of the first and second horizontal transfer shafts are combined to be able to rotate around the shaft so as to support the first and second horizontal transfer shafts to the guide supports; horizontal operation parts for transferring the first and second transfer support plates in opposite directions to each other along the guide supports; and a first rotation part for rotating the first and second horizontal transfer shafts in the opposite directions to each other according to movement of the first and second transfer support plates.

Furthermore, the first connection part includes first and second chamber connection parts to which lower parts of the first and second horizontal transfer shafts are fixed and connected.

Additionally, the wheel holder part vertically rotating part includes: first and second rotary shafts disposed on sides of the first and second connection parts to be laid, and each of the first and second rotary shafts having one side combined with each other to be able rotate around the shaft; and a second rotation part for vertically rotating the first and second rotary shafts.

In addition, the second connection part includes the first and second hinge connection parts fixed to the other sides of the first and second rotary shafts and hinge-coupled with the mounting plate. Therefore, the first and second rotary shafts are respectively rotated toward the front and the rear of the vehicle according to rotation of the first and second horizontal transfer shafts.

Moreover, the wheel holder parts further include: a holding members having a hook-shaped end rotatably combined with upper parts of the first and second loading stands to hold the wheels of the vehicle; and a loading stand operating part transferring the first and second loading stands bilaterally to adjust a width between the wheels of the vehicle.

Furthermore, the vehicle transfer robot further includes a support part for supporting the wheel holder parts transferred above the frame part.

Additionally, the support part includes: an outer frame arranged at a lower part of the upper end frame and combined with the outer face of the vertical frame; and a support rotatably mounted on the outer frame and rotating in order to support the wheel holder parts when being lifted up after the vehicle is loaded on the loading part.

In addition, the driving part includes: a wheel; a wheel rotation motor for transmitting rotary power to the wheel; a direction change motor for changing a direction of the wheel; a direction change module for changing the direction of the wheel according to a rotational angle of the direction change motor; and a fixing bracket for fixing the driving part to the vertical frame.

Moreover, the driving part further includes a foldable auxiliary stand combined with the fixing bracket and formed in a multistage foldable manner, and an auxiliary wheel combined with an end of the auxiliary stand.

Furthermore, the vehicle transfer robot includes: a detection sensor for recognizing existence of a vehicle below the carriage in a state where another vehicle is loaded on the carriage and recognizing a distance between the vehicle and the carriage when the vehicle is loaded on the carriage; and a control unit for controlling operation of the vehicle transfer robot by a signal of the detection sensor.

Additionally, the vehicle transfer robot further includes a guide rail continuously mounted inside the upper end frame to transfer the detection sensor, and a transfer body combined with the detection sensor to transfer the detection sensor along the guide rail.

The above and other objects, features and advantages of the present invention will be more clearly understood from the following detailed description taken in conjunction with the accompanying drawings.

The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

Advantageous Effects

The intelligent vehicle transfer robot according to the present invention which is prepared in the parking space can effectively execute parking and unparking of a vehicle without using additional structure or parking guide passage.

MODE FOR INVENTION

Hereinafter, reference will be now made in detail to a preferred embodiment of the present invention with reference to the attached drawings. In the drawings, thicknesses of lines and sizes of constituent elements may be exaggerated for clarity and convenience in explanation.

Further, wordings to be described later are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Figure 1:
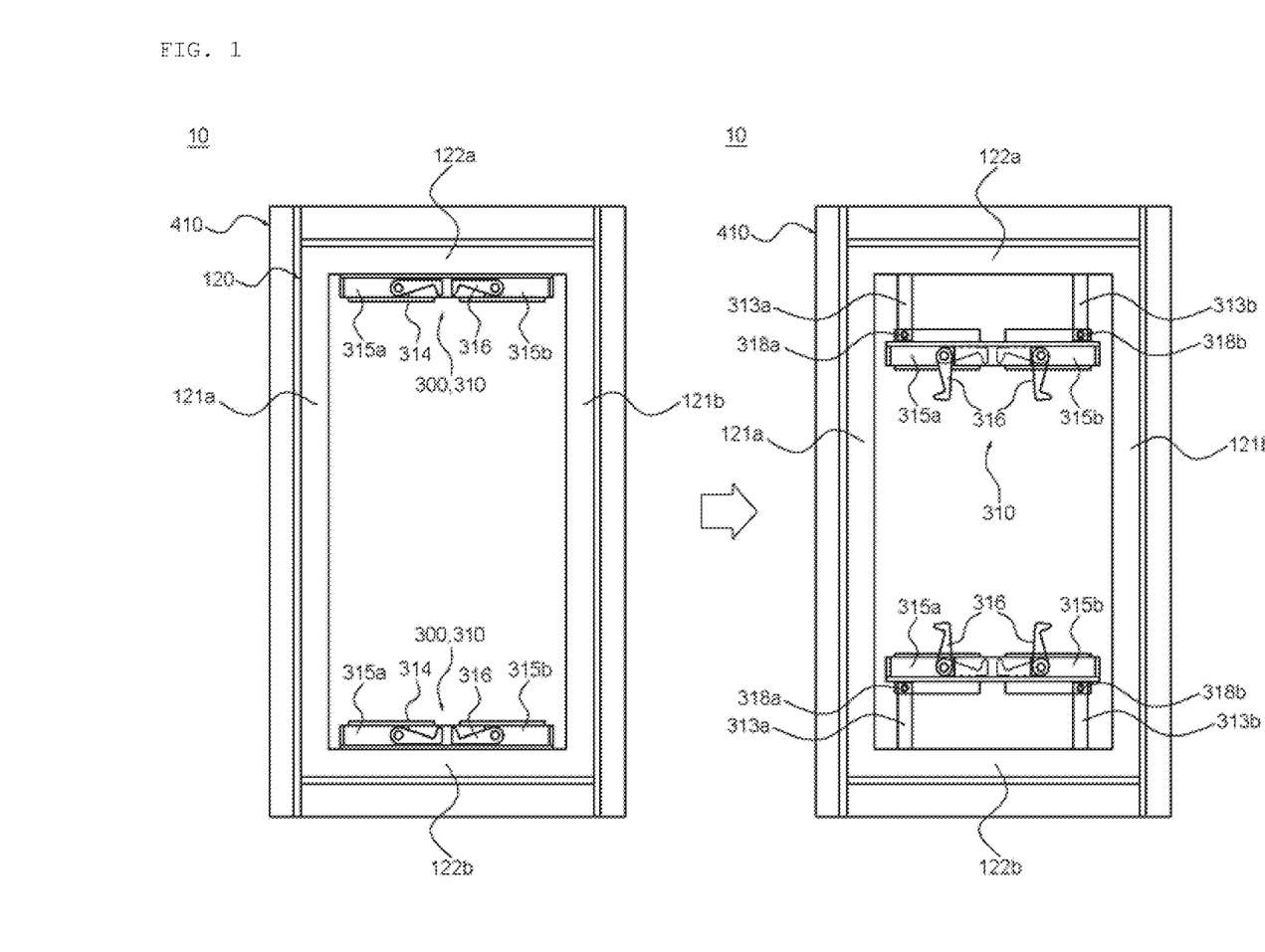
FIG. 1 is a plan view showing a vehicle transfer robot according to a preferred embodiment of the present invention.
Figure 2:
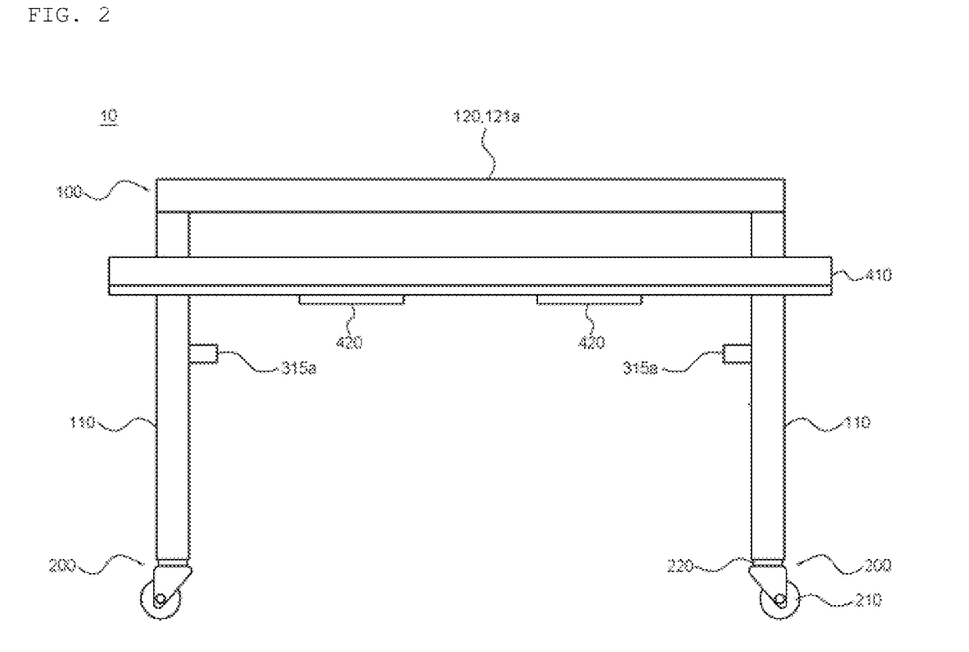
FIG. 2 is a side view showing the vehicle transfer robot according to the preferred embodiment of the present invention.
Figure 3:
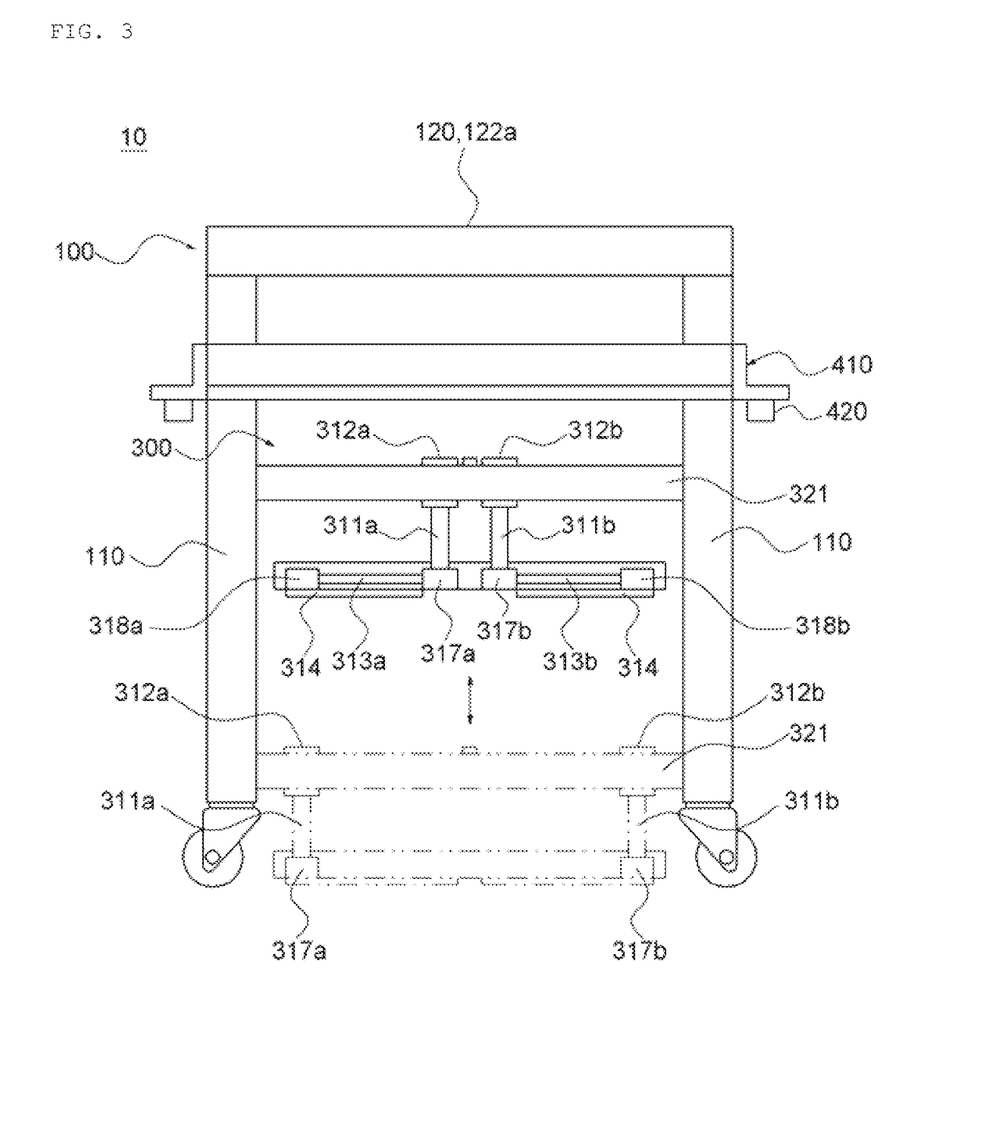
FIG. 3 is a front view showing the vehicle transfer robot according to the preferred embodiment of the present invention.
Figure 4:
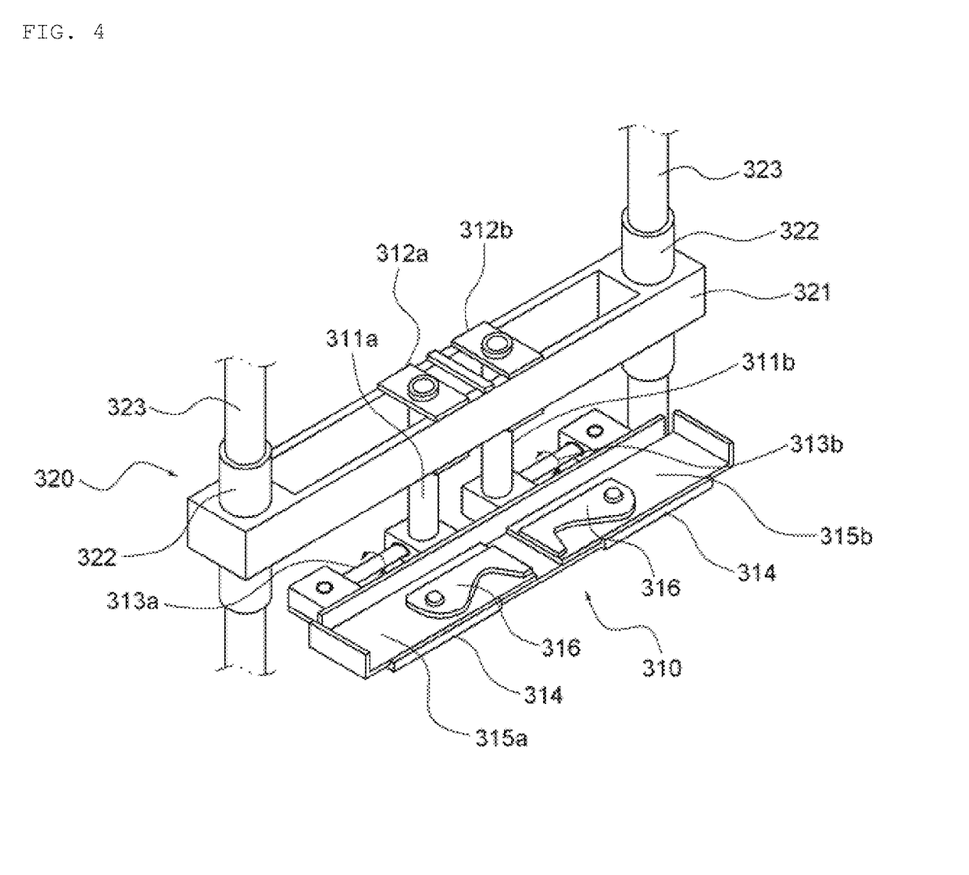
FIGS. 4 to 8 are perspective views showing an operational state of a carriage according to the preferred embodiment of the present invention.
Figure 5:
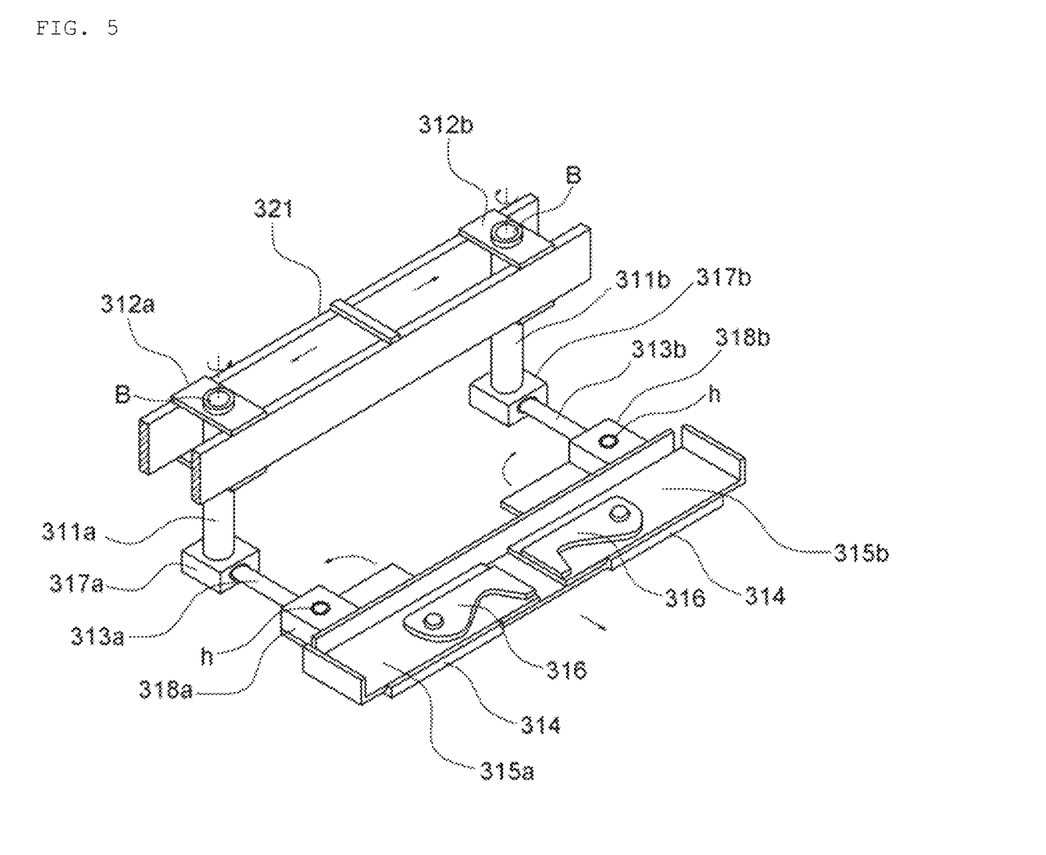
Figure 6:
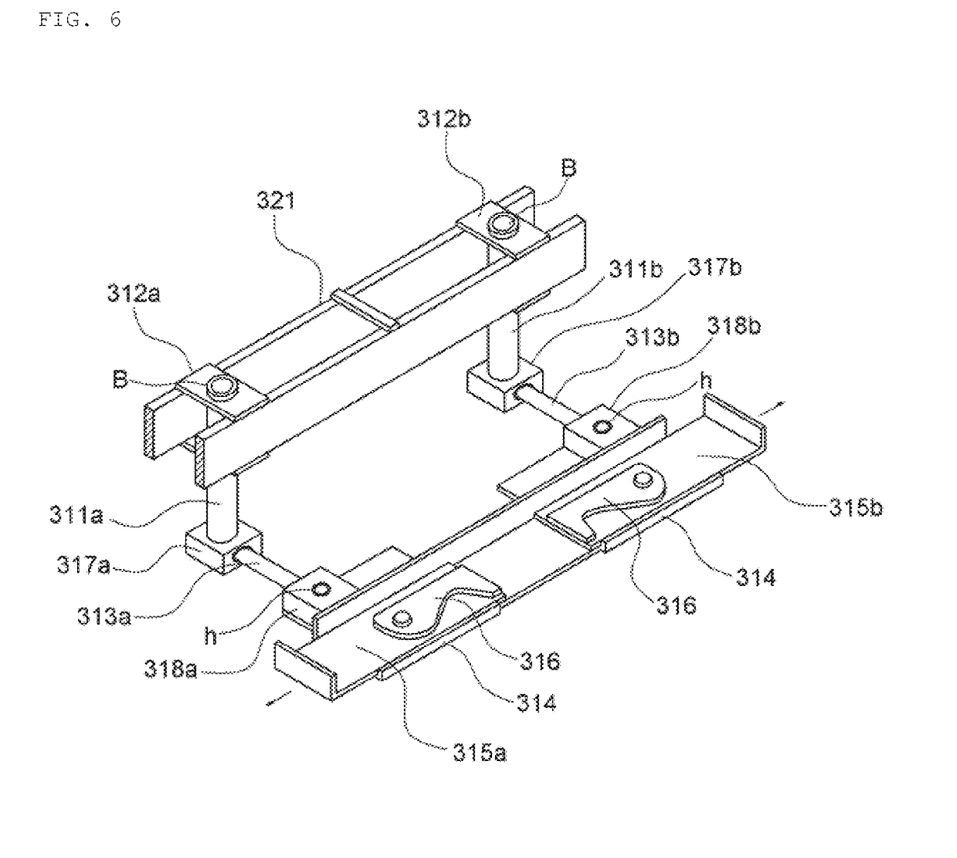
Figure 7:
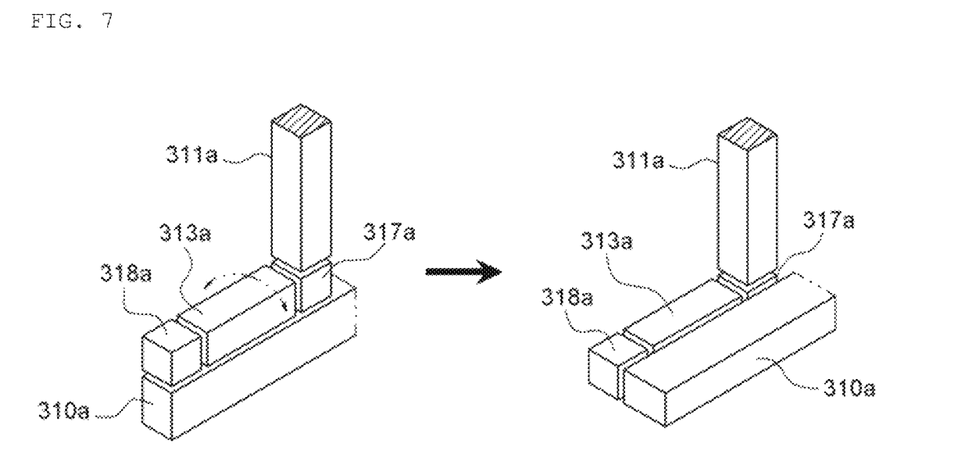
Figure 8:
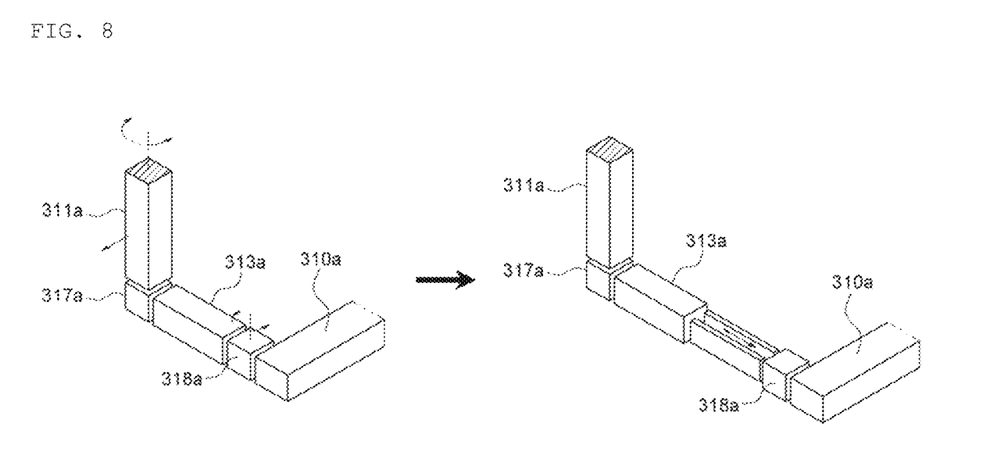
Figure 9:
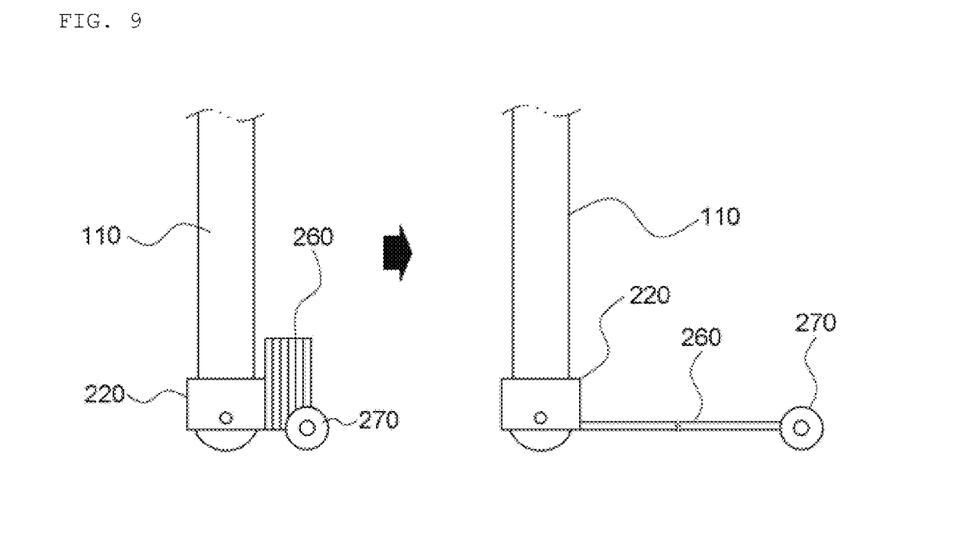
FIG. 9 is a side view showing operation of an auxiliary wheel according to the preferred embodiment of the present invention.
Figure 10:
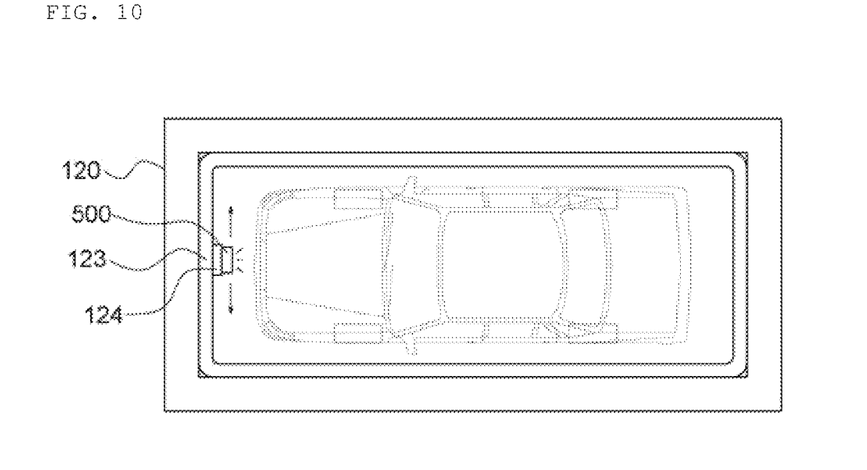
FIG. 10 is a plan view showing operation of a detection sensor according to the preferred embodiment of the present invention.
Figure 11:
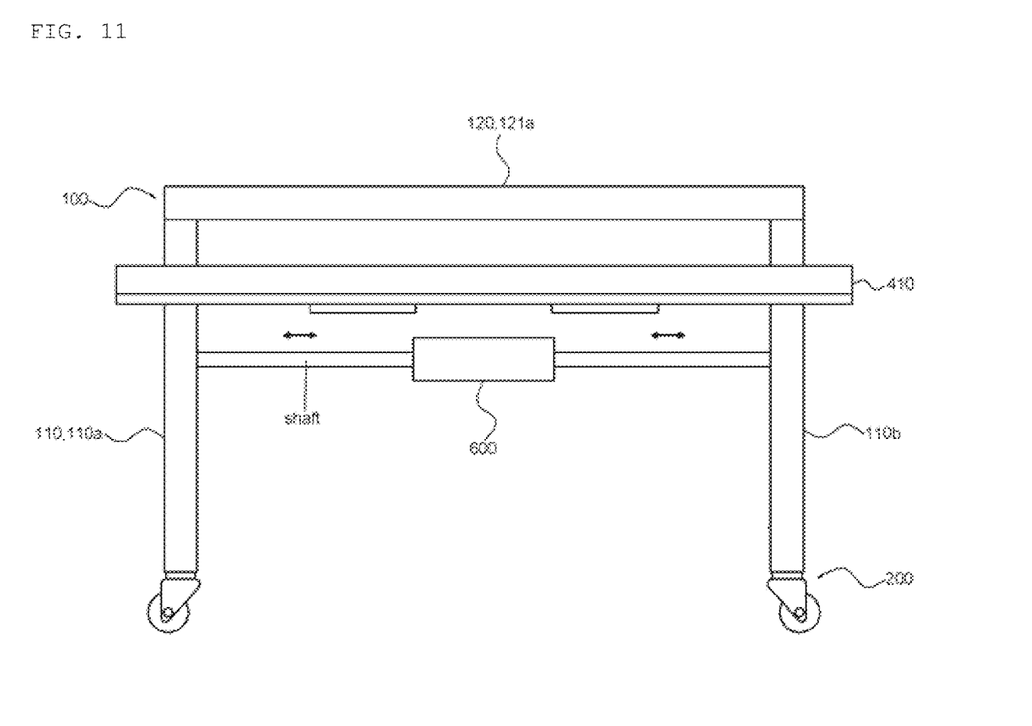
FIG. 11 is a side view showing a horizontal control device according to the preferred embodiment of the present invention.

FIG. 1 is a plan view showing a vehicle transfer robot according to a preferred embodiment of the present invention, FIG. 2 is a side view showing the vehicle transfer robot according to the preferred embodiment of the present invention, FIG. 3 is a front view showing the vehicle transfer robot according to the preferred embodiment of the present invention, FIGS. 4 to 8 are perspective views showing an operational state of a carriage according to the preferred embodiment of the present invention, FIG. 9 is a side view showing operation of an auxiliary wheel according to the preferred embodiment of the present invention, FIG. 10 is a plan view showing operation of a detection sensor according to the preferred embodiment of the present invention, and FIG. 11 is a side view showing a horizontal control device according to the preferred embodiment of the present invention.

An intelligent vehicle transfer robot 10 according to an embodiment of the present invention is a vehicle transfer robot 10 prepared in a parking lot (not shown) having a plurality of parking zones formed by parking lines indicated in the form of a checkerboard.

The parking lot has parking lines indicated on a flat surface to indicate locations of vehicles, can increase the number of vehicles parked by removing a vehicle movement passage through which vehicles move, and moves vehicles parked in the parking lot through the vehicle transfer robot 10 so as to execute parking and unparking of the vehicles.

In this instance, the vehicle transfer robot 10 moves in all directions along the parking lines, transfers and parks a vehicle in the parking zone or takes the vehicle, which is parked in the parking zone, out, moves after lifting up the vehicle and transfers the vehicle into a space above a parked vehicle in order to execute parking and unparking the vehicle.

Moreover, location markers (not shown) is disposed at the indicated parking lines to recognize movement locations of the vehicle transfer robot when the vehicle transfer robot moves, and the vehicle transfer robot 10 includes a detection sensor (not shown) attached to sense the location markers in order to move while tracing the location markers through the detection sensor.

In this instance, the location markers are made of a reflecting material to reflect light or a metallic material reacting to electricity. The detection sensor is an optical sensor sensing the location markers through a light emitting part and a light receiving part or a magnetic field sensor sensing the metallic material by generating a magnetic field.

Furthermore, the parking units divided by the parking lines respectively have identification codes.

Additionally, the vehicle transfer robot 10 may have a tag attached thereto to check the location of the vehicle transfer robot.

In addition, the vehicle transfer robot 10 includes: a vehicle sensor (not shown) for determining whether or not there is a vehicle in the parking unit; an input unit (not shown) receiving information on incoming and outgoing of a vehicle; a control unit (not shown) for analyzing the information received through the input unit to execute incoming and outgoing of the vehicle; and a storage unit (not shown) for storing license plate numbers of vehicles parked in the parking unit.

Therefore, the storage unit stores information on parking of vehicles according to identification codes corresponding to the parking units, so that the vehicle transfer robot 10 can be moved to the parking unit, where a vehicle is not parked, through the storage information of the storage unit when a user wants to park his or her vehicle.

Moreover, the vehicle sensor may be an ultrasonic sensor or an image sensor. The vehicle transfer robot 10 stops unloading of the vehicle loaded on the vehicle transfer robot 10 according to a signal of the vehicle sensor so that it can prevent an accident which may occur when the vehicle is doubly parked in the parking unit where another vehicle is previously parked.

Furthermore, the parking lot may have guide rails (not shown) mounted on the ground surface or guide bars (not shown) mounted higher than vehicles in order to prevent separation of the vehicle transfer robot 10.

That is, the vehicle transfer robot 10 can run autonomously through an automatic control of a parking control system or the robot in order to execute parking or unparking of vehicles, and a worker can directly control and operate the vehicle transfer robot 10 through a remote control.

Additionally, in this specification, the parking lines are indicated in the parking lot in order to operate the vehicle transfer robot 10, but the parking lines are just an embodiment of the present invention.

In addition, as shown in the drawings, the vehicle transfer robot 10 according to the present invention includes: a frame part 100, which has four vertical frames 110 arranged on the ground vertically and spaced apart from each other at predetermined intervals to form a quadrangular frame and an upper end frame 120 connecting upper end parts of the four vertical frames 110 to form a quadrangle; operation parts 200 mounted at lower end parts of the vertical frames 110 to move the frame part 110; and carriages 300 mounted on the frame part 100 to load a vehicle.

Therefore, the vehicle transfer robot 10 moves in all directions after lifting up a vehicle and transfers the vehicle into a space above a parked vehicle in order to execute parking and unparking of the vehicle.

In this instance, the frame part 100 has four sides, namely, the left side, the right side, the front side and the rear side, by spaces among the four vertical frames 110, the ground surface and the upper end frame 120, and the upper end frame 120 is divided into two long side upper end frames 121a and 121b having the left side and the right side and two short side upper end frames 122a and 122b having the front side and the rear side.

Additionally, the vehicle transfer robot 10 can transfer the vehicle into the space above the parked vehicle while passing by the vehicle parked on the ground surface through the four sides.

In addition, the carriages 300 are respectively arranged on the front side and the rear side of the frame part 100 corresponding to the front and the rear of the vehicle, and includes: a loading part 310 which is transferred toward the front and the rear of the vehicle and on which the vehicle is loaded; and a lifting part 320 combined with the frame part 100 to lift up the loading part 310.

In this instance, the lifting part 320 includes: guide supports 321 arranged at lower parts of the two short side upper end frames 122a and 122b in parallel with each other; transport stands 322 combined with both ends of the guide supports 321; vertical guide bars 323 respectively mounted in the vertical frames 110 and combined with the transport stands 322; and ascending and descending driving parts (not shown) for ascending and descending the transport stands 322 along the vertical guide bars 323.

Moreover, the ascending and descending driving parts are respectively mounted upper parts of the two short side upper end frames 122a and 122b and may be winches using a wire or a chain connected with the guide supports 321 or the transport stands 322, a gear, a screw jack, or a hydraulic device.

That is, for instance, the ascending and descending driving part may have a ring connected with a chain or a wire and formed at both sides or at the center of the guide supports 321.

Furthermore, the ascending and descending driving part may have pulleys formed on the inner faces or an upper end parts of the short side upper end frames 122a and 122b and motors for transmitting rotary power to the pulleys.

Therefore, the lifting part 320 ascends and descends the horizontal transport stands 322 along the vertical guide bars 323 depending on rotation of the pulleys.

Additionally, the lifting part 320 may further include a safety device to prevent the loading part 310 from falling due to malfunction or damage of the driving part.

For instance, the safety device includes a brake running between the horizontal transport stands 322 and the vertical guide bars 323 by hydraulic pressure so as to control operation of the guide supports 321 by operating the brake in case of emergency.

Alternatively, a safety hole is formed between the horizontal transport stands 322 and the vertical guide bars 323 to prevent falling or a safety belt principle is applied to prevent the guide supports 321 from falling.

In the meantime, the loading part 310 includes: wheel holder parts 310a on which front wheels and rear wheels of the vehicle are held; and a wheel holder part operating unit connect between the lifting part and the wheel holder part 310a with each other to transfer the wheel holder parts 310a.

In addition, the wheel holder part operating unit includes: a wheel holder part forward and backward operating part combined with the guide supports 321 to transfer the wheel holder part 310a below the vehicle through a gap between front and rear bumpers of the vehicle and the ground surface; a wheel holder part vertically rotating part for rotating the wheel holder part 310a in a vertical direction which is perpendicular to the ground surface; a first connection part connected between the wheel holder part forward and backward operating part and the wheel holder part vertically rotating part; and a second connection part connected between the wheel holder part vertically rotating part and the wheel holder part 310a.

In this instance, the wheel holder part 310a includes: a mounting plate 314 rotatably combined with the second connection part; and first and second loading stands 315a and 315b combined with the upper part of the mounting plate 314 to be bilaterally symmetrical so that wheels of the vehicle are put on the first and second loading stands.

Additionally, the wheel holder part forward and backward operating part includes: first and second horizontal transfer shafts 311a and 311b vertically arranged on the guide supports 321 and protruding downwards; first and second transfer support plates 312a and 312b with which upper parts of the first and second horizontal transfer shafts 311a and 311b are combined to be able to rotate around the shaft so as to support the first and second horizontal transfer shafts 311a and 311b to the guide supports 321; horizontal operation parts (not shown) for transferring the first and second transfer support plates 312a and 312b in opposite directions to each other along the guide supports 321; and a first rotation part (not shown) for rotating the first and second horizontal transfer shafts 311a and 311b in the opposite directions to each other according to movement of the first and second transfer support plates 312a and 312b.

In addition, the first connection part includes first and second chamber connection parts 317a and 317b to which lower parts of the first and second horizontal transfer shafts 311a and 311b are fixed and connected.

Moreover, the wheel holder part vertically rotating part includes: first and second rotary shafts 313a and 313b disposed on sides of the first and second connection parts to be laid, and each of the first and second rotary shafts 313a and 313b having one side combined with each other to be able rotate around the shaft; and a second rotation part for vertically rotating the first and second rotary shafts 313a and 313b.

Therefore, the wheel holder part 310a is rotated in the ground surface direction to be ascended or descended in a state where it does not protrude toward the inner space of the frame part 100.

That is, sides of the first and second rotary shafts 313a and 313b are combined with the first and second chamber connection parts 317a and 317b by the medium of bearings, and the other sides of the first and second rotary shafts 313a and 313b are combined and fixed with first and second hinge connection parts 318a and 318b.

Therefore, the first and second rotary shafts 313a and 313b are vertically rotated by the second rotation part, and the wheel holder part 310a connected and combined with the first and second hinge connection parts 318a and 318b are also rotated by the rotation of the rotary shafts.

Moreover, the first and second rotary shafts 313a and 313b are expandable.

Furthermore, the second connection part includes the first and second hinge connection parts 318a and 318b fixed to the other sides of the first and second rotary shafts 313a and 313b and hinge-coupled with the mounting plate 314.

Therefore, the first and second rotary shafts 313a and 313b are respectively rotated toward the front and the rear of the vehicle according to rotation of the first and second horizontal transfer shafts 311a and 311b.

In this instance, preferably, the horizontal operation parts and the first and second rotation parts have motors as a driving source. Such a structure of the driving source is omitted in the detailed description since those skilled in the art can invent easily.

That is, when the first and second rotary shafts 313a and 313b are rotated by movement of the first and second horizontal transfer shafts 311a and 311b, the loading parts 310 are respectively moved forwards and backwards by the carriage 300.

Furthermore, after the loading parts 310 are moved below the front and rear bumpers of the vehicle to support and hold the wheels of the vehicle, the loading parts 310 are moved upwards by the lifting part 320, so that parking and unparking of the vehicle can be carried out while moving the vehicle into the space above another parked vehicle.

In this instance, preferably, the loading part 310 includes a brake device to prevent rotation of the first and second horizontal transfer shafts 311a and 311b.

Additionally, because the carriage 300 according to the present invention does not have additional frames for loading and lifting the vehicle at the right and left sides of the frame part 100, when parking of the vehicle is carried out by the vehicle transfer robot 10, the carriage narrows a space between vehicles so that the vehicles are packed tightly in the parking lot in order to enhance parking efficiency for the same area.

In addition, the wheel holder parts 310a further include: a holding members 316 having a hook-shaped end rotatably combined with upper parts of the first and second loading stands 315a and 315b to hold the wheels of the vehicle; and a loading stand operating part (not shown) transferring the first and second loading stands 315a and 315b bilaterally to adjust a width between the wheels of the vehicle.

Moreover, the mounting plate 314 and the first and second loading stands 315a and 315b are formed integratedly or are divided into two parts to be respectively combined with the first and second hinge connection parts 318a and 318b.

Meanwhile, the vehicle transfer robot 10 further includes a support part 400 for supporting the wheel holder parts 310a transferred above the frame part 100.

In this instance, the support part 400 includes: an outer frame 410 arranged at a lower part of the upper end frame 120 and combined with the outer face of the vertical frame 110; and a support 420 rotatably mounted on the outer frame 410 and rotating in order to support the wheel holder parts 310a when being lifted up after the vehicle is loaded on the loading part.

Furthermore, the driving parts 200 are respectively arranged at the lower ends of the four vertical frames 110, and each of the driving parts 200 includes: a wheel 210; a wheel rotation motor for transmitting rotary power to the wheel 210; a direction change motor for changing a direction of the wheel 210; a direction change module for changing the direction of the wheel according to a rotational angle of the direction change motor; and a fixing bracket 220 for fixing the driving part to the vertical frame 110.

Additionally, the driving part 200 further includes a foldable auxiliary stand 260 combined with the fixing bracket 220 and formed in a multistage foldable manner, and an auxiliary wheel 270 combined with an end of the auxiliary stand 260.

In addition, the auxiliary stand 260 is disposed to spread straightly in the lateral direction of the front and rear sides of the vehicle transfer robot 10 when the vehicle transfer robot 10 moves laterally, in order to enhance stability.

Moreover, the vehicle transfer robot 10 further includes a detection sensor 500 for recognizing existence of a vehicle below the carriage 300 in a state where another vehicle is loaded on the carriage 300 and recognizing a distance between the vehicle and the carriage 300 when the vehicle is loaded on the carriage 300, and a control unit for controlling operation of the vehicle transfer robot 10 by a signal of the detection sensor 500.

Furthermore, the vehicle transfer robot 10 further includes a guide rail 123 continuously mounted inside the upper end frame 120 to transfer the detection sensor 500, and a transfer body 124 combined with the detection sensor 500 to transfer the detection sensor along the guide rail 123.

Additionally, the vehicle transfer robot 10 further includes an electric power generator (not shown) for generating electricity using weight of the loading part 310 on which the vehicle is loaded.

In addition, the vehicle transfer robot 10 can store energy using a spring, a clockwork, a pneumatic pressure device, a hydraulic pressure device, or others.

That is, the electric power generator can store energy using potential energy generated when the loading part 310 lowers.

Referring to FIG. 9, there is a problem that the vertical frame 110 is inclined when the carriage 300 on which the vehicle is loaded repeats ascending and descending.

In order to prevent the problem, the vehicle transfer robot 10 includes a horizontal adjuster 600. The horizontal adjuster 600 includes a shaft disposed between the vertical frames 110a and 110b connected with the two long side upper end frames 121a and 121b and connected with the vertical frames 110a and 110b at both sides of the horizontal adjuster 600.

Moreover, the horizontal adjuster 600 includes a hydraulic device or a driving motor for transferring the shaft in the long side direction.

Therefore, the horizontal adjuster 600 can pull or push the vertical frames 110a and 110b by transferring the shaft in the long side direction in order to control a slope.

Furthermore, the vertical frames 110a and 110b include sensors for measuring the slope of the vertical frames 110a and 110b, and control units for controlling operation of the horizontal adjuster 600 according to signals of the sensors.

That is, the horizontal adjuster 600 is operated according to the signals of slope sensors (not shown) for measuring the slope of the vertical frame 110 and the shaft is transferred so that the slope of the vertical frame can be controlled.

Although exemplary embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

The invention claimed is:

1. An intelligent vehicle transfer robot for automatically executing parking and unparking by loading a vehicle, the intelligent vehicle transfer robot (10) comprising:
   a frame part (100), which has four vertical frames (110) arranged on the ground vertically and spaced apart from each other at predetermined intervals to form a quadrangular frame and an upper end frame (120) connecting upper end parts of the four vertical frames (110) to form a quadrangle;
   operation parts (200) respectively mounted at lower end parts of the vertical frames (110) to move the frame part (100); and
   carriages (300) mounted on the frame part (100) to load a vehicle,
   wherein the vehicle transfer robot transfers a vehicle into a space above another vehicle parked while moving in all directions after lifting up the vehicle, in order to carry out parking and unparking of the vehicle,
   wherein the carriages (300) are respectively arranged on a front side and a rear side of the frame part (100) corresponding to a front and a rear of the vehicle, and includes:
   a loading part (310) which is transferred toward the front and the rear of the vehicle and on which the vehicle is loaded; and
   a lifting part (320) combined with the frame part (100) to lift up the loading part (310),
   wherein the loading part (310) includes:
   wheel holder parts (310a) on which front wheels and rear wheels of the vehicle are held; and
   a wheel holder part operating unit connect between the lifting part (320) and the wheel holder parts (310a) with each other to transfer the wheel holder parts (310a),
   wherein the wheel holder part operating unit includes:
   a wheel holder part forward and backward operating part combined with guide supports (321) of the lifting part (320) to transfer the wheel holder parts (310a) below the vehicle through a gap between front and rear bumpers of the vehicle and the ground surface, wherein the wheel holder part forward and backward operating part includes:

first and second horizontal transfer shafts (311a, 311b) vertically arranged on the guide supports (321) and protruding downwards; and first and second transfer support plates (312a, 312b) with which upper parts of the first and second horizontal transfer shafts (311a, 311b) are combined to be able to rotate around the shaft so as to support the first and second horizontal transfer shafts (311a, 311b) to the guide supports (321), wherein the first and second transfer support plates (312a, 312b) are transferred in opposite directions to each other along the guide supports (321), and the first and second horizontal transfer shafts (311a, 311b) rotate in the opposite directions to each other according to movement of the first and second transfer support plates (312a, 312b).

2. The intelligent vehicle transfer robot according to claim 1, wherein the frame part (100) has four sides, namely, the left side, the right side, the front side and the rear side, by spaces among the four vertical frames (110), the ground surface and the upper end frame (120), and the upper end frame (120) is divided into two long side upper end frames (121a, 121b) having the left side and the right side and two short side upper end frames (122a, 122b) having the front side and the rear side, and wherein the vehicle transfer robot (10) transfers the vehicle into the space above the parked vehicle while passing by the vehicle parked on the ground surface through the four sides.

3. The intelligent vehicle transfer robot according to claim 1, wherein the driving part (200) includes:
a wheel (210);
a wheel rotation motor for transmitting rotary power to the wheel (210);
a direction change motor for changing a direction of the wheel (210);
a direction change module for changing the direction of the wheel according to a rotational angle of the direction change motor; and
a fixing bracket (220) for fixing the driving part to the vertical frame (110).

4. The intelligent vehicle transfer robot according to claim 1, wherein the vehicle transfer robot (10) includes:

a detection sensor (500) for recognizing existence of a vehicle below the carriage (300) in a state where another vehicle is loaded on the carriage (300) and recognizing a distance between the vehicle and the carriage (300) when the vehicle is loaded on the carriage (300); and a control unit for controlling operation of the vehicle transfer robot (10) by a signal of the detection sensor (500).

5. The intelligent vehicle transfer robot according to claim 1, wherein the lifting part (320) includes:
guide supports (321) arranged at lower parts of the two short side upper end frames (122a, 122b) in parallel with each other;
transport stands (322) combined with both ends of the guide supports (321); and
vertical guide bars (323) respectively mounted in the vertical frames (110) and combined with the transport stands (322), and
wherein the transport stands (322) ascend and descend along the vertical guide bars (323).

6. The intelligent vehicle transfer robot according to claim 1, wherein the wheel holder part operating unit includes:
a wheel holder part vertically rotating part for rotating the wheel holder part (310a) in a vertical direction which is perpendicular to the ground surface;
a first connection part connected between the wheel holder part forward and backward operating part and the wheel holder part vertically rotating part; and
a second connection part connected between the wheel holder part vertically rotating part and the wheel holder part (310a).

7. The intelligent vehicle transfer robot according to claim 6, wherein the wheel holder part (310a) includes:
a mounting plate (314) rotatably combined with the second connection part; and
first and second loading stands (315a, 315b) combined with the upper part of the mounting plate (314) to be bilaterally symmetrical so that wheels of the vehicle are put on the first and second loading stands.

8. The intelligent vehicle transfer robot according to claim 1, wherein the first connection part includes first and second chamber connection parts (317a, 317b) to which lower parts of the first and second horizontal transfer shafts (311a, 311b) are fixed and connected.

* * * * *